(12) United States Patent
Matsumoto

(10) Patent No.: US 8,361,378 B2
(45) Date of Patent: Jan. 29, 2013

(54) IMMERSION NOZZLE USED FOR MEASURING LEVEL OF MOLTEN METAL AND APPARATUS FOR MEASURING LEVEL OF MOLTEN METAL

(75) Inventor: Koichi Matsumoto, Tokyo (JP)

(73) Assignee: Nireco Corporation, Tokyo (JP)

( * ) Notice: Subject to any disclaimer, the term of this patent is extended or adjusted under 35 U.S.C. 154(b) by 0 days.

(21) Appl. No.: 13/342,731

(22) Filed: Jan. 3, 2012

(65) Prior Publication Data

US 2012/0256782 A1 Oct. 11, 2012

Related U.S. Application Data

(63) Continuation of application No. PCT/JP2011/002052, filed on Apr. 6, 2011.

(51) Int. Cl.
  *C21D 11/00* (2006.01)
(52) U.S. Cl. ............... 266/94; 324/124; 164/488
(58) Field of Classification Search .......... 342/124; 164/488; 266/94
  See application file for complete search history.

(56) References Cited

U.S. PATENT DOCUMENTS 5,507,854 A * 4/1996 Yamada et al. ............... 75/387
6,309,442 B1 * 10/2001 Usher ........................... 75/386

FOREIGN PATENT DOCUMENTS

| JP | 56-152152 | 11/1981 |
| JP | 60-136852 | 9/1985 |
| JP | 07-191130 | 7/1995 |
| JP | 09-166477 | 6/1997 |
| JP | 09-178533 | 7/1997 |
| JP | 3107183 | 9/2000 |

OTHER PUBLICATIONS

International Search Report and Written Opinion corresponding to International Application No. PCT/JP2011/002052 dated Jul. 5, 2011.

* cited by examiner

*Primary Examiner* — Timothy A Brainard
(74) *Attorney, Agent, or Firm* — Squire Sanders (US) LLP

(57) ABSTRACT

An immersion nozzle used for measuring a level of molten metal, wherein a first conductive portion and a second conductive portion which are made of carbon are imbedded in a pair of slots which are provided on the surface of the immersion nozzle separately from each other and along the longitudinal direction in such a way that the first and second conductive portions form integral parts of the surface of the immersion nozzle.

3 Claims, 7 Drawing Sheets

US 8,361,378 B2

IMMERSION NOZZLE USED FOR MEASURING LEVEL OF MOLTEN METAL AND APPARATUS FOR MEASURING LEVEL OF MOLTEN METAL

TECHNICAL FIELD

The present invention relates to an immersion nozzle used for measuring a level of molten metal and an apparatus for measuring a level of molten metal using microwaves.

BACKGROUND ART

Continuous casting is a process in which molten metal is cooled and made to solidify in order to continuously supply a molded piece in a predetermined shape.

FIG. 1 shows a continuous casting machine used for continuous casting process. The continuous casting machine includes a ladle vessel 510, a long nozzle 520, a tundish 530, a plurality of immersion nozzles 150 and a plurality of molds 540. FIG. 1 shows a single immersion nozzle and a single mold alone.

Molten metal, for example molten steel, fed to the ladle vessel 510 is delivered through the long nozzle 520 to the tundish 530. Molten metal stored in the tundish 530 is infused through the plurality of immersion nozzles 150 to the plurality of molds 540. The molds are water-cooled and the infused molten metal is cooled and made to solidify so that a metal piece, for example, a slab is continuously formed.

Keeping a level of molten metal in a mold of the continuous casting machine constant is important in improving product quality. Accordingly, various devices and methods have been developed to measure a level of molten metal in a mold.

A method in which an electrode is used as a path of electromagnetic wave when a level of molten metal in a mold is measured through propagation time of electromagnetic wave has been developed (JP3107183B). In this method, electrodes are inserted into the molten metal and a level displacement of the molten metal is measured using a difference in propagation time of a transmitted signal, which depends on the level displacement. More specifically, a first electrode and a second electrode are inserted into the molten metal which is electrically conductive. A first pseudo random signal is transmitted to the first electrode. A first product is obtained by multiplying the first pseudo random signal by a second pseudo random signal having the same pattern as that of the first pseudo random signal and a frequency which is slight different from that of the first pseudo random signal. A second product is obtained by multiplying a signal obtained from the second electrode by the second pseudo random signal. Then, a level displacement of the molten metal is calculated based on a time difference between a time interval of points of maximum correlation values in time pattern of the first product and a time interval of points of maximum correlation values in time pattern of the second product.

The reason that in the method described in JP3107183B electrodes are used as a path of propagation of electromagnetic wave is below. A common method in which a transmission antenna sends electromagnetic wave to the surface of the molten metal in the mold and a reception antenna receives electromagnetic wave reflected on the surface is affected by multipath reflection and cannot carry out a high accuracy measurement. Further, an antenna of a sufficiently large size can hardly be installed because of small spaces around the mold.

FIG. 2 illustrates the method for measuring a level of molten metal described in JP3107183B. In order to measure a level of molten metal (molten steel) 600 from the initial state, two electrodes 550A and 550B of length of approximately from 300 to 400 millimeters have to be inserted into the molten metal. When a metal having a melting point lower than that of the molten metal is used for the electrodes 550A and 550B, the electrodes 550A and 550B in contact with the molten metal 600 will dissolve and disappear. Accordingly, a level of the molten metal can be measured when the level of the molten metal is moving upward while it cannot be measured when it is moving down. When a metal having a melting point higher than the molten metal is used for the electrodes 550A and 550B, the electrodes 550A and 550B will be taken off by the metal (steel) 600 which has solidified after being cooled in the mold. In either case, the electrodes 550A and 550B have to be installed for each measurement. Since a space between the tundish 530 and the mold 540 are small, the two electrodes 550A and 550B have to be installed before the tundish 530 moves to a position above the mold 540. Thus, the installation requires time and labor consuming operation.

A method in which the tundish is used as a path of transmission of electromagnetic wave in place of an electrode has been developed (JP9-178533A). However, this method also employs another electrode, and therefore the above-described problem will not be solved.

Thus, an apparatus for measuring a level of molten metal using electromagnetic waves which allows high-accuracy measurement of a level of molten metal without the requirement for time and labor consuming operation has not been developed.

PRIOR ART DOCUMENTS

Patent Documents

Patent Document 1: JP3107183B
Patent Document 2: JP9-178533A

Accordingly, there is a need for an immersion nozzle used for measuring a level of molten metal and an apparatus for measuring a level of molten metal using electromagnetic waves which allow high-accuracy measurement of a level of molten metal without the requirement for time and labor consuming operation.

SUMMARY OF INVENTION

An immersion nozzle according to the first aspect of the invention is an immersion nozzle used for measuring a level of molten metal, wherein a first conductive portion and a second conductive portion which are made of carbon are imbedded in a pair of slots which are provided on the surface of the immersion nozzle separately from each other and along the longitudinal direction in such a way that the first and second conductive portions form integral parts of the surface of the immersion nozzle.

In the immersion nozzle according to the first aspect of the present invention, the first conductive portion and the second conductive portion are made of carbon and integrated into an immersion nozzle separately from each other. The melting point of carbon is much higher than that of molten metal, such as molten steel, the conductive portions will not dissolve unlike metal electrodes the melting point of which are lower than the melting point of the molten metal. Further, molten steel is constantly supplied by the immersion nozzle to areas around the immersion nozzle and molten steel will not solidify in the areas. Accordingly, the first conductive portion and the second conductive portion will not be taken off by the steel which has solidified. Thus, unlike the conventional electrodes, the first conductive portion and the second conductive portion can be repeatedly used for a plurality of measuring operations. As a result, the need for installation and adjustment of electrodes for each measuring operation, which are time and labor consuming is eliminated. Further, carbon forming the first conductive portion and the second conductive portion is also an ingredient of the immersion nozzle itself. Accordingly, it will not affect chemical reaction in the continuous casting process. In the immersion nozzle according to the present aspect, the first and second conductive portions are imbedded in the immersion nozzle and form integral parts of the surface of the immersion nozzle. Thus, a shape of the outer face of the immersion nozzle remains unchanged. Accordingly, the shape of the outer face will not affect physical phenomena in the continuous casting process. Further, the first and second conductive portions and the immersion nozzle are hard to separate because the first and second conductive portions are imbedded in the immersion nozzle.

An apparatus for measuring a level of molten metal according to the second aspect of the present invention uses the immersion nozzle according to the first aspect of the present invention and includes a distance measuring section which sends a microwave signal to the first conductive portion, receives from the second conductive portion the microwave signal which has propagated through a transmission line including the first conductive portion, the molten metal and the second conductive portion and measure a propagated distance of the microwave signal based on propagation time or phase of the microwave signal which has propagated through the transmission line.

The apparatus for measuring a level of molten metal according to the second aspect of the present invention does not require installation and adjustment of electrodes for each measuring operation, which are time and labor consuming, as described above, and therefore allows high-accuracy measurement of a level of molten metal without the requirement for time and labor consuming operation.

In an apparatus for measuring a level of molten metal according to the first embodiment of the present invention, the frequency of the reference microwave signal is 600 megaHertz or less and the distance measuring section obtains a phase of the microwave signal which has propagated through the transmission line and measures the propagated distance of the reference microwave signal using the phase.

According to the present embodiment, a level of molten metal can be measured with a higher accuracy by measuring a change in phase alone using microwave signal of a relatively low frequency.

MODE FOR CARRYING OUT THE INVENTION

Figure 1:
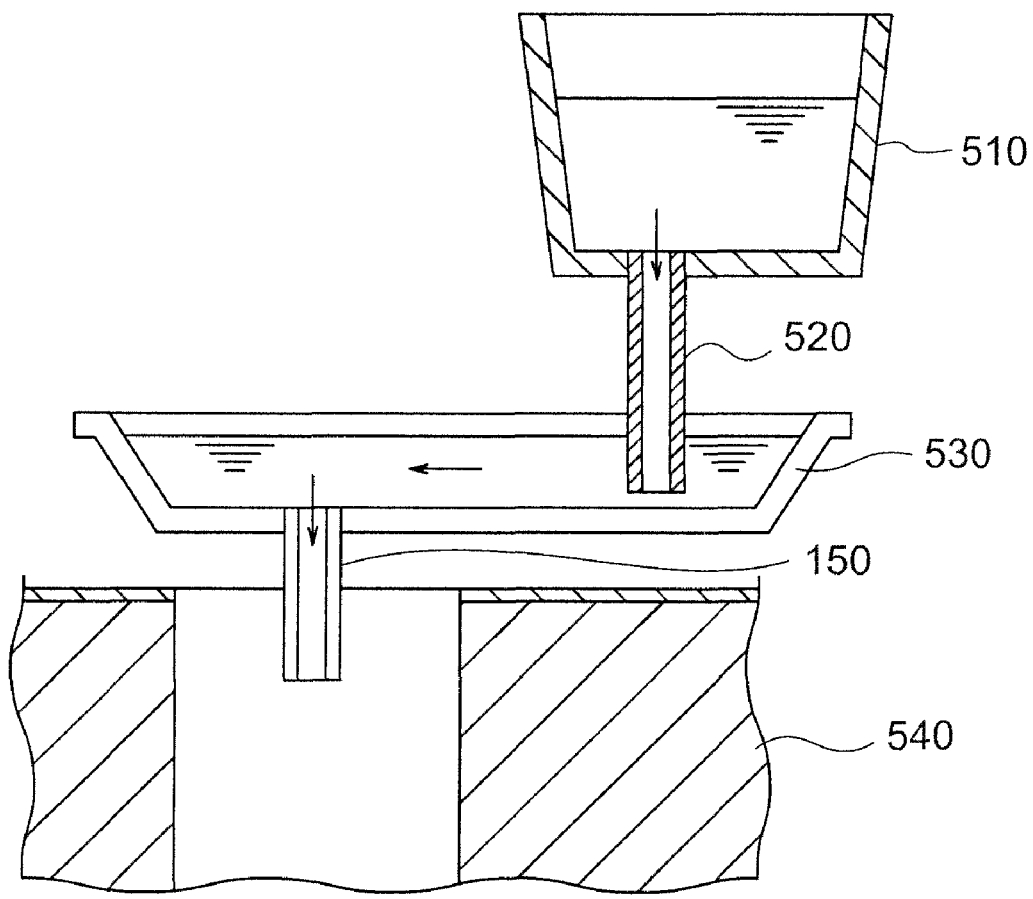
FIG. 1 shows a continuous casting machine used for continuous casting process.
Figure 2:
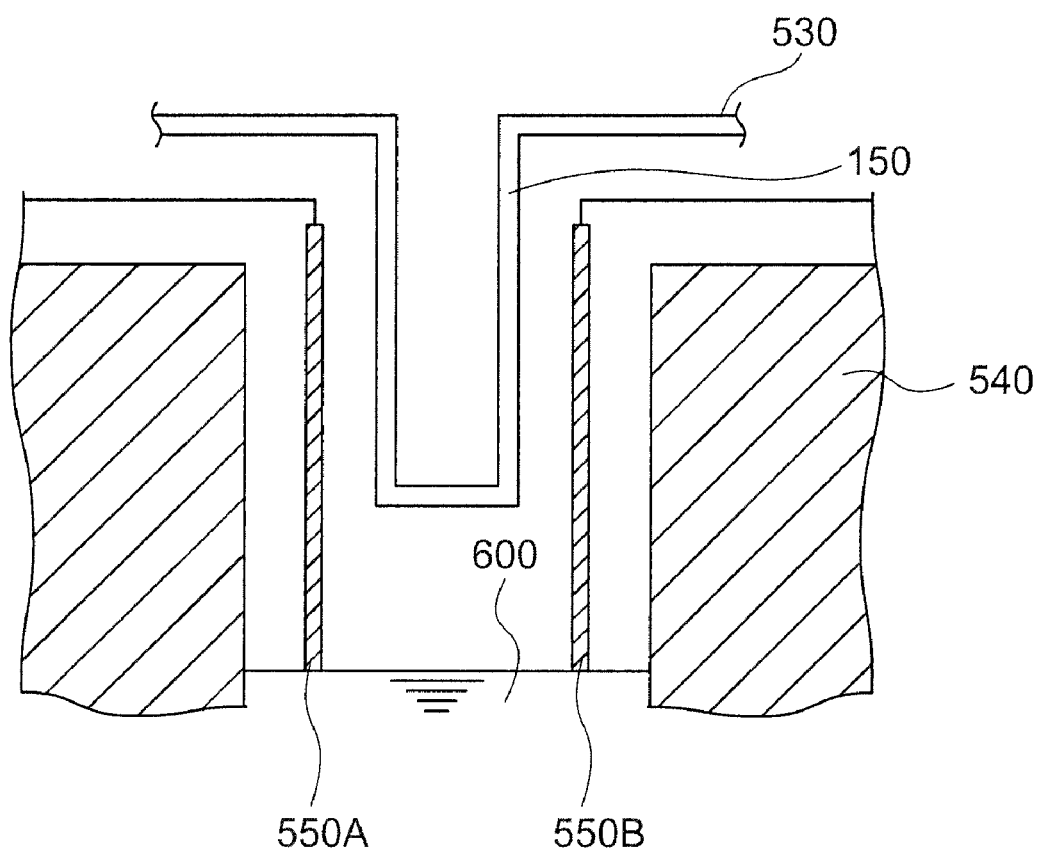
FIG. 2 illustrates the method for measuring a level of molten metal described in JP3107183B.
Figure 3:
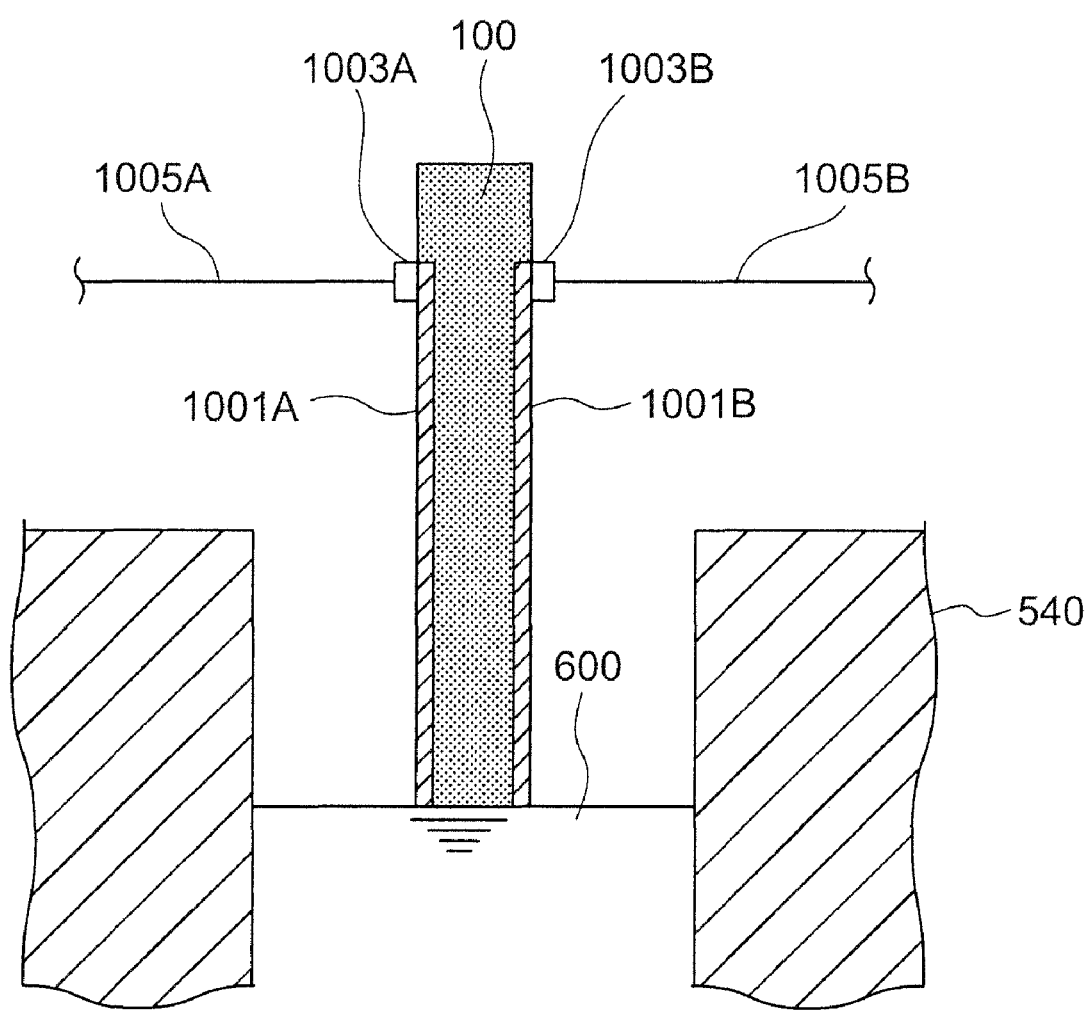
FIG. 3 shows a part of an apparatus for measuring a level of molten metal according to an embodiment of the present invention, which includes a first conductive portion, a second conductive portion and their peripheral components.

FIG. 3 shows a part of an apparatus for measuring a level of molten metal according to an embodiment of the present invention, which includes a first conductive portion 1001A, a second conductive portion 1001B and their peripheral components. The first conductive portion 1001A and the second conductive portion 1001B correspond respectively to the first electrode and the second electrode of the apparatus for measuring a level of molten metal described in JP3107183B. In the present embodiment, the first conductive portion 1001A and the second conductive portion 1001B are provided along the longitudinal direction of an immersion nozzle 100 and integrated into the immersion nozzle 100. The first conductive portion 1001A is connected to a signal output terminal 1003A, to which a coaxial cable 1005A is connected. Similarly, the second conductive portion 1001B is connected to a signal output terminal 1003B, to which a coaxial cable 1005B is connected. The coaxial cable 1005A and the coaxial cable 1005B are connected to a distance measuring section of the apparatus for measuring a level of molten metal. The distance measuring section will be described later.

Figure 4A:
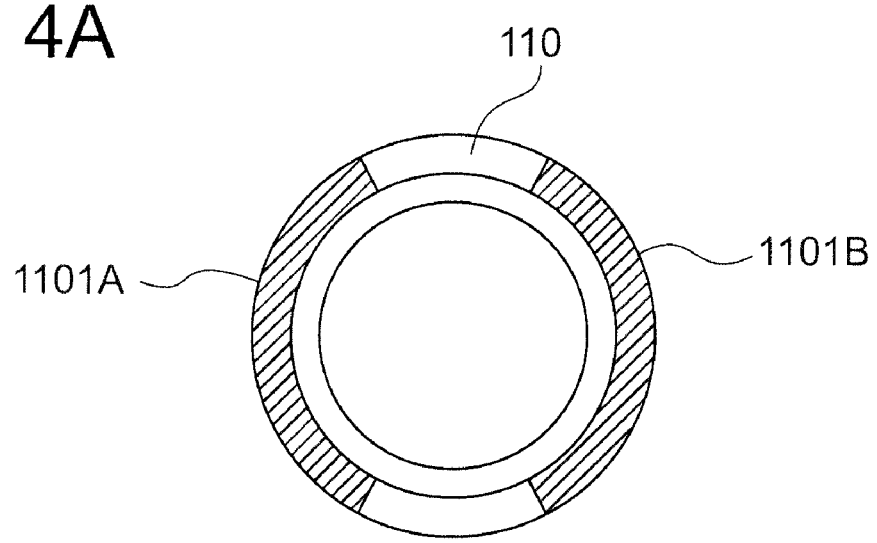
FIGS. 4A and 4B show an example of a construction of an immersion nozzle into which the first and second conductive portions are integrated.
Figure 4B:
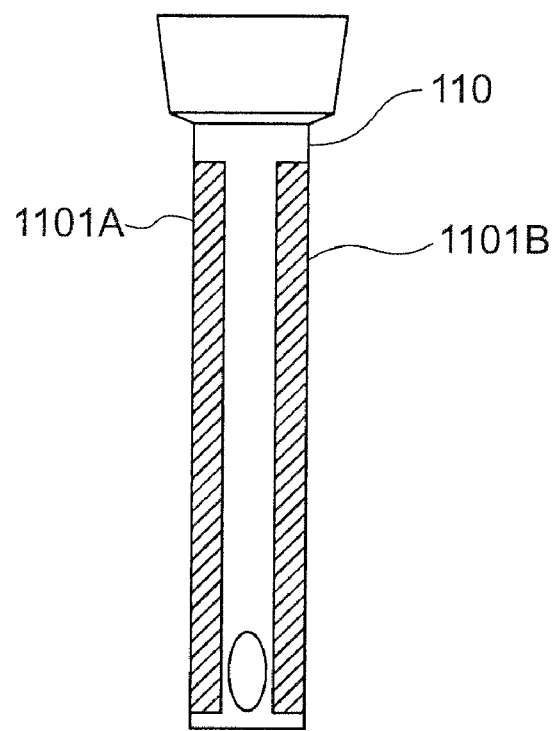

FIGS. 4A and 4B show an example of a construction of an immersion nozzle into which the first and second conductive portions are integrated. FIG. 4A shows a view of a cross section perpendicular to the longitudinal direction of the immersion nozzle (horizontal plane). FIG. 4B is a side view of the immersion nozzle. In the present embodiment, a pair of slots is provided on the surface of the immersion nozzle 110 separately from each other and along the longitudinal direction. The first conductive portion 1101A and the second conductive portion 1101B are imbedded in the slots in such a way that the first and second conductive portions form integral parts of the surface of the immersion nozzle. As shown in FIG. 4A, in the horizontal cross section of the immersion nozzle 110, the first conductive portion 1101A and the second conductive portion 1101B are arranged in such a way that a straight-line segment connecting the center of the immersion nozzle 110 and the center of the first conductive portion 1101A forms an angle of 180 degrees with a straight-line segment connecting the center of the immersion nozzle 110 and the center of the second conductive portion 1101B. In other words, in the horizontal cross section of the immersion nozzle 110, the first conductive portion 1101A and the second conductive portion 1101B are located directly opposite each other.

Figure 5A:
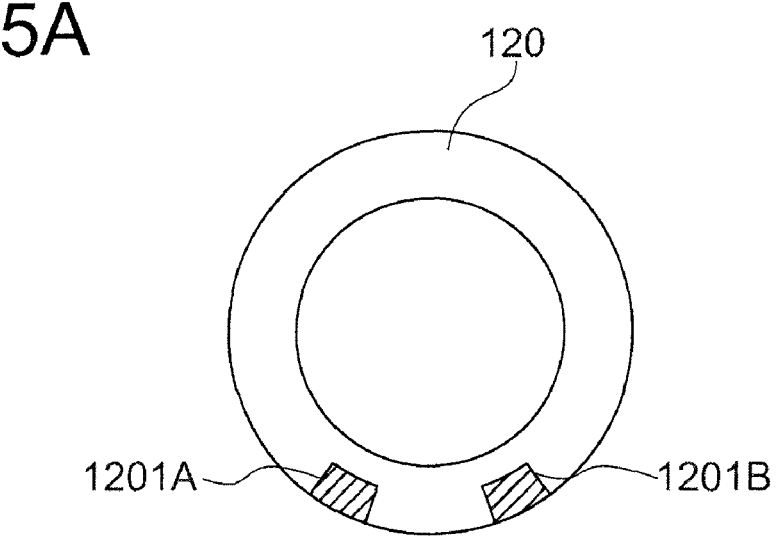
FIGS. 5A and 5B show another example of a construction of an immersion nozzle into which the first and second conductive portions are integrated.
Figure 5B:
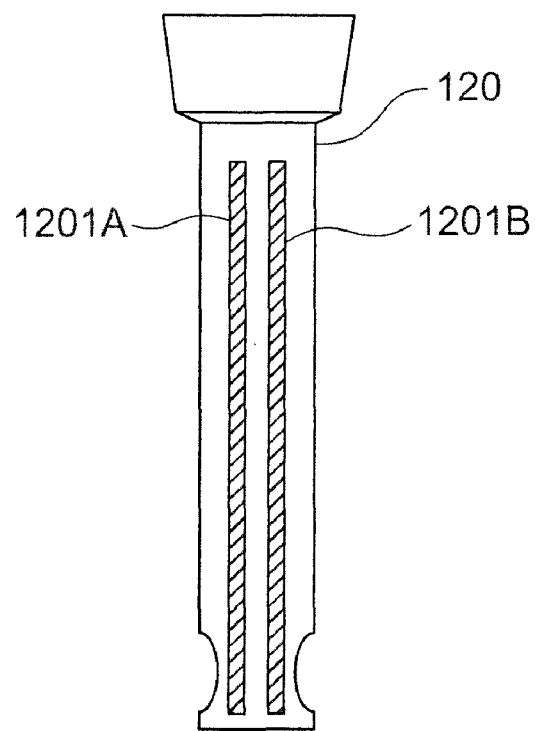

FIGS. 5A and 5B show another example of a construction of an immersion nozzle into which the first and second conductive portions are integrated. FIG. 5A shows a view of a cross section perpendicular to the longitudinal direction of the immersion nozzle (horizontal plane). FIG. 5B is a side view of the immersion nozzle. In the present embodiment, a pair of slots is provided on the surface of the immersion nozzle 120 separately from each other and along the longitudinal direction. The first conductive portion 1201A and the second conductive portion 1201B are imbedded in the slots in such a way that the first and second conductive portions form integral parts of the surface of the immersion nozzle. As shown in FIG. 5A, in the horizontal cross section of the immersion nozzle 120, the first conductive portion 1201A and the second conductive portion 1201B are arranged in such a way that a straight-line segment connecting the center of the immersion nozzle 120 and the center of the first conductive portion 1201A forms an angle of approximately 50 degrees with a straight-line segment connecting the center of the immersion nozzle 120 and the center of the second conductive portion 1201B. In other words, in the horizontal cross section of the immersion nozzle 120, the first conductive portion 1201A and the second conductive portion 1201B are located separately from each other with a relatively small space therebetween.

The immersion nozzles 110 and 120 are made of aluminium oxide ($Al_2O_3$) as a main ingredient into which certain percentages of silicon dioxide ($SiO_2$), carbon (C) and the like are blended. The first conductive portions 1101A and 1201A and the second conductive portions 1101B and 1201B are made of carbon. The carbon used as an ingredient of the immersion nozzles 110 and 120 is blended with other materials. Accordingly, the carbon has a high electrical resistance and cannot serve as a conductive material. The first conductive portions 1101A and 1201A and the second conductive portions 1101B and 1201B are made of carbon alone, and therefore they serve as a conductive material and function as a waveguide.

Besides, since the melting point of carbon is much higher than that of molten metal, for example molten steel, the conductive portions will not dissolve unlike the electrodes of the apparatus for measuring a level of molten metal described in JP3107183B. Further, a solidification layer of molten steel appears in areas in contact with the mold (540 in FIG. 3) while molten steel is constantly supplied by the immersion nozzle (100 in FIG. 3) to areas around the immersion nozzle and molten steel will not solidify in the areas. Accordingly, the first conductive portions 1101A and 1201A and the second conductive portions 1101B and 1201B will not be taken off by steel which has solidified. Thus, unlike the conventional electrodes, the first conductive portions and the second conductive portions can be repeatedly used for a plurality of measuring operations. As a result, the need for installation and adjustment of electrodes for each measuring operation which require time and effort is eliminated.

Further, carbon forming the first conductive portions 1101A and 1201A and the second conductive portions 1101B and 1201B is also an ingredient of the immersion nozzle itself. Accordingly, it will not affect chemical reaction in the continuous casting process.

Either of a pair of the first conductive portion 1101A and the second conductive portion 1101B and a pair of the first conductive portion 1201A and the second conductive portion 1201B is imbedded in a pair of slots provided separately from each other along the longitudinal direction of the immersion nozzle in such a way that the first and second conductive portions form integral parts of the surface of the immersion nozzle. Thus, a shape of the outer face of the immersion nozzle remains unchanged. Accordingly, the shape of the outer face will not affect physical phenomena in the continuous casting process. Further, the first and second conductive portions and the immersion nozzle are hard to separate because the first and second conductive portions are imbedded in the immersion nozzle.

Figure 6:
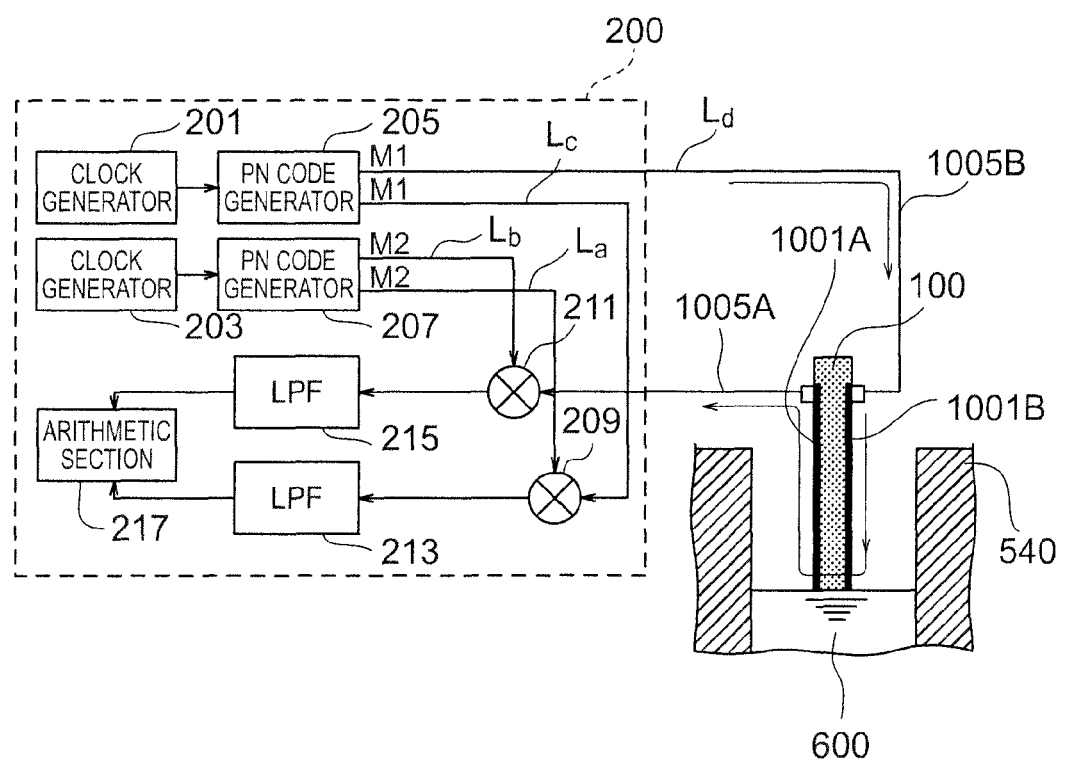
FIG. 6 shows a configuration of an apparatus for measuring a level of molten metal according to an embodiment of the present invention.

FIG. 6 shows a configuration of an apparatus for measuring a level of molten metal according to an embodiment of the present invention. The apparatus for measuring a level of molten metal according to the present embodiment includes the first conductive portion 1001A and the second conductive portion 1001B integrated into the immersion nozzle 100, their peripheral components and a distance measuring section 200.

The first conductive portion 1001A and the second conductive portion 1001B integrated into the immersion nozzle 100 and their peripheral components have been described with FIGS. 3 to 5. The distance measuring section 200 will be described below. The construction of the distance measuring section 200 may be identical with that disclosed in JP3107183B.

The distance measuring section 200 includes a first clock generator 201, a second clock generator 203, a first pseudo random signal generator 205, a second pseudo random signal generator 207, a first multiplier 209, a second multiplier 211, a first low pass filter 213, a second low pass filter 215 and an arithmetic section 217. In FIG. 6, the first and second pseudo random signal generators are designated as PN code generators.

The first clock generator 201 generates pulses of the frequency of f1 (for example, 1500.001 MHz) for a clock period while the second clock generator 203 generates pulses of the frequency of f2 which is slightly smaller than f1 (for example, 1500.000 MHz) for a clock period. The first pseudo random signal generator 205 generates a first pseudo random signal M1 of period P1 while the second pseudo random signal generator 207 generates a second pseudo random signal M2 which has the same signal pattern as signal M1 and has period P2 which is slightly different from period P1. The first multiplier 209 multiplies M1 sent by the first pseudo random signal generator 205 through a transmission line Lc by M2 sent by the second pseudo random signal generator 207 through a transmission line La. The second multiplier 211 multiplies M1 sent by the first pseudo random signal generator 205 through a transmission line Ld by M2 sent by the second pseudo random signal generator 207 through a transmission line Lb.

The first low pass filter 213 removes high frequency components from the output of the first multiplier 209 and delivers a temporal pattern a period of which is determined as an interval between points which show the maximum coefficient of correlation. Similarly, the second low pass filter 215 removes high frequency components from the output of the second multiplier 211 and delivers a temporal pattern a period of which is determined as an interval between points which show the maximum coefficient of correlation.

The arithmetic section 217 obtains a difference between a propagation time along the transmission line Ld and a propagation time along the transmission line Lc based on a time difference between the period of the temporal pattern delivered by the first low pass filter 213, which is determined as an interval between points which show the maximum coefficient of correlation and the period of the temporal pattern delivered by the second low pass filter 215, which is determined as an interval between points which show the maximum coefficient of correlation.

The transmission line Ld includes a section above the molten metal level of the second conductive portion 1001B and a section above the molten metal level of the first conductive portion 1001A. Accordingly, the molten metal level can be obtained based on a difference between a propagation time along the transmission line Ld and a propagation time along the transmission line Lc.

The above-described method magnifies the propagation time of signal by a factor of 1.5 million. Accordingly, signal can be processed easily and with a high accuracy.

Figure 7:
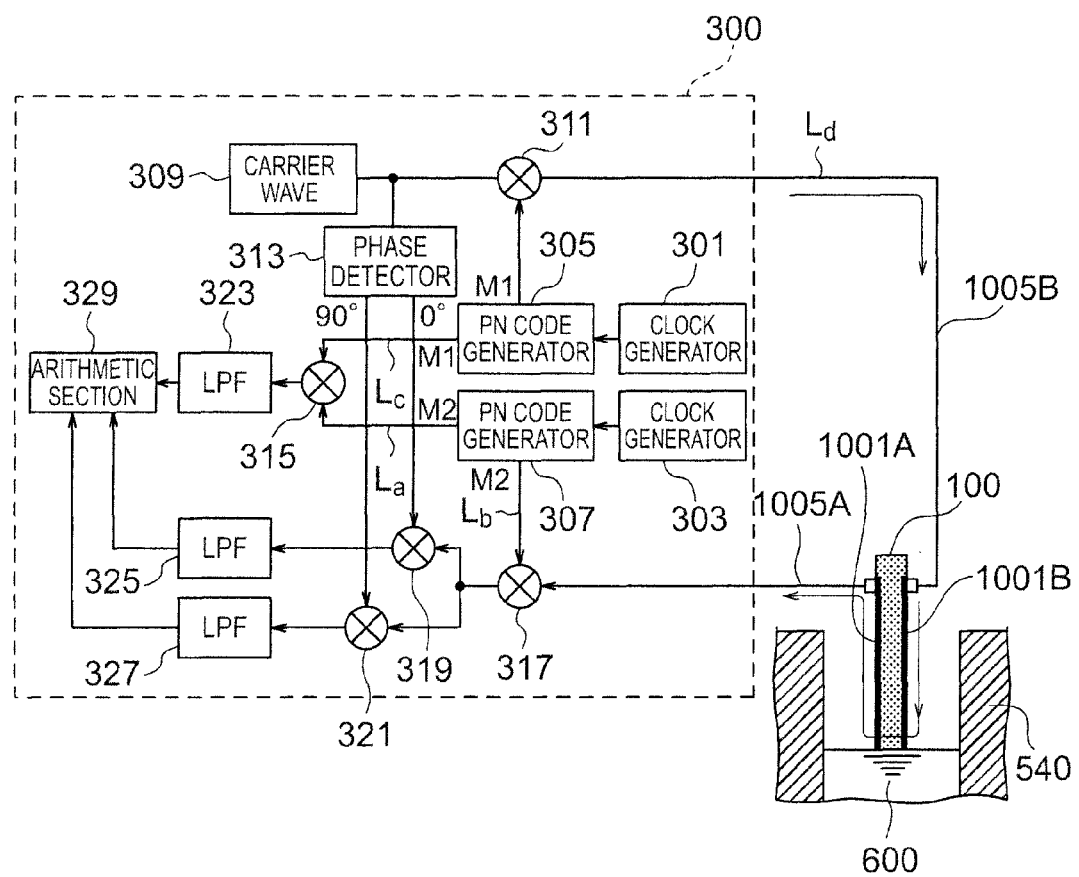
FIG. 7 shows a configuration of an apparatus for measuring a level of molten metal according to another embodiment of the present invention.

FIG. 7 shows a configuration of an apparatus for measuring a level of molten metal according to another embodiment of the present invention. The apparatus for measuring a level of molten metal according to the present embodiment includes the first conductive portion 1001A and the second conductive portion 1001B integrated into the immersion nozzle 100, their peripheral components and a distance measuring section 300. The first conductive portion 1001A and the second conductive portion 1001B integrated into the immersion nozzle 100 and their peripheral components have been described with FIGS. 3 to 5. The distance measuring section 300 will be described below.

The distance measuring section 300 includes a first clock generator 301, a second clock generator 303, a first pseudo random signal generator 305, a second pseudo random signal generator 307, a carrier wave generator 309, a phase detector 313, a first multiplier 311, a second multiplier 315, a third multiplier 317, a fourth multiplier 319, a fifth multiplier 321, a first low pass filter 323, a second low pass filter 325, a third low pass filter 327 and an arithmetic section 329.

The first clock generator 301 generates pulses of the frequency of f1 (for example, 100.004 MHz) for a clock period while the second clock generator 303 generates pulses of the frequency of f2 which is slightly smaller than f1 (for example, 99.996 MHz) for a clock period. The first pseudo random signal generator 305 generates a first pseudo random signal M1 of period P1 while the second pseudo random signal generator 307 generates a second pseudo random signal M2 which has the same signal pattern as signal M1 and has period P2 which is slightly different from period P1. In FIG. 7, the first and second pseudo random signal generators are designated as PN code generators. The first multiplier 311 multiplies carrier wave of frequency of 500 MHz from the carrier wave generator 309 with the first pseudo random signal M1 and delivers spectral diffusion signal obtained by phase-modulating the carrier wave to the coaxial cable 1005B. The second multiplier 315 multiplies signal M1 sent by the first pseudo random signal generator 305 through a transmission line Lc by M2 sent by the second pseudo random signal generator 307 through a transmission line La. The first low pass filter 323 removes high frequency components from the output of the second multiplier 315 and delivers a temporal pattern a period of which is determined as an interval between points which show the maximum coefficient of correlation. In other words, the output of the first low pass filter 323 supplies a reference signal which shows a value other than zero when the first and second pseudo random signals are in phase with each other.

The third multiplier 317 multiplies signal M1 sent by the first pseudo random signal generator 305 through a transmission line Ld by M2 sent by the second pseudo random signal generator 307 through a transmission line Lb. The output of the third multiplier 317 is delivered to the fourth multiplier 319 and the fifth multiplier 321, respectively as R1 and R2. The phase detector 313 supplied with carrier wave by the carrier wave generator 309 delivers signal I which has in-phase component (phase of 0 degree) of the input signal and signal Q which has quadrature phase component (phase of 90 degrees) of the input signal. Signals I and Q are supplied to the fourth multiplier 319 and the fifth multiplier 321, respectively. The fourth multiplier 319 multiplies signal I from the phase detector 313 by R1 from the third multiplier 317. The second low pass filter 325 removes high frequency components from the output of the fourth multiplier 319 and delivers a temporal pattern a period of which is determined as an interval between points which show the maximum coefficient of correlation. The fifth multiplier 321 multiplies signal Q from the phase detector 313 by R2 from the third multiplier 317. The third low pass filter 327 removes high frequency components from the output of the fifth multiplier 321 and delivers a temporal pattern a period of which is determined as an interval between points which show the maximum coefficient of correlation.

The maximum value I' of the output of the second low pass filter 325 during the period of the reference signal and the maximum value Q' of the output of the third low pass filter 327 during the period of the reference signal are obtained. Then, phase $\theta$ of M1 which has passed through the transmission line Ld is obtained by the following equation.

$$\theta = \tan^{-1} \frac{Q'}{I'}$$

According to new findings of the inventor, even when frequency of carrier wave made to propagate through the first conductive portion 1001A and the second conductive portion 1001B integrated into the immersion nozzle 100 is reduced to 600 mega-Hertz or less, the distance measuring section 300 can perform measurement with a high accuracy. If frequency of carrier wave is 500 mega-Hertz, for example, the wavelength is 600 millimeters. For example, measurement range of molten steel level in the continuous casting machine in the steel industry is approximately 400 millimeters, which is within the wavelength.

In general, a relationship between propagated distance l of electromagnetic wave and phase $\theta$ in unit of radian is represented by the following equation when wavelength is represented as $\lambda$.

$$2\pi\theta = \frac{l}{\lambda} \tag{1}$$

In the present embodiment, the propagated distance l of carrier wave which has propagated through the transmission line Ld is a sum of length x of a section above the molten metal level of the first conductive portion 1001A, length x of a section above the molten metal level of the second conductive portion 1001B and a fixed length. When the fixed length is represented as $2\alpha$ and $$l=2x+2\alpha$$

is substituted into Equation (1), the following equation is obtained.

$$x=\pi\lambda\theta-\alpha \tag{2}$$

Accordingly, the molten metal level (molten steel level) x can be obtained from Equation (2) after phase $\theta$ of M1 which has passed through the transmission line Ld has been obtained.

According to the present embodiment, the frequency of carrier wave is reduced to 600 mega-Hertz or less, and therefore the molten metal level can be measured with a high accuracy by measuring phase of carrier wave alone.

What is claimed is:

1. An immersion nozzle used for measuring a level of molten metal, wherein a first conductive portion and a second conductive portion which are made of carbon are imbedded in a pair of slots which are provided on the surface of the immersion nozzle separately from each other and along the longitudinal direction in such a way that the first and second conductive portions form integral parts of the surface of the immersion nozzle.

2. An apparatus for measuring a level of molten metal using the immersion nozzle according to claim 1, comprising:

a distance measuring section which sends a microwave signal to the first conductive portion, receives from the second conductive portion the microwave signal which has propagated through a transmission line including the first conductive portion, the molten metal and the second conductive portion and measure a propagated distance of the microwave signal based on propagation time or phase of the microwave signal which has propagated through the transmission line.

3. An apparatus for measuring a level of molten metal according to claim 2, wherein the frequency of the microwave signal is 600 mega-Hertz or less and the distance measuring section obtains a phase of the microwave signal and measures the propagated distance of the microwave signal which has propagated through the transmission line using the phase.

* * * * *